(12) United States Patent
Gambrell et al.

(10) Patent No.: US 11,560,337 B2
(45) Date of Patent: Jan. 24, 2023

(54) ADDITIVE FOR HYDRAULIC BINDER USEFUL TO PREVENT THE FORMATION OF RUST-COLORED STAINS AT THE SURFACE OF HYDRAULIC COMPOSITIONS

(71) Applicant: CHRYSO, Issy les Moulineaux (FR)

(72) Inventors: Bruce Gambrell, Louisville, KY (US); Brian D Breitzman, Rockwall, TX (US)

(73) Assignee: CHRYSO, Issy les Moulineaux (FR)

( * ) Notice: Subject to any disclaimer, the term of this patent is extended or adjusted under 35 U.S.C. 154(b) by 239 days.

(21) Appl. No.: 16/634,969

(22) PCT Filed: Jul. 30, 2018

(86) PCT No.: PCT/EP2018/070592
§ 371 (c)(1),
(2) Date: Jan. 29, 2020

(87) PCT Pub. No.: WO2019/025365
PCT Pub. Date: Feb. 7, 2019

(65) Prior Publication Data
US 2020/0239372 A1 Jul. 30, 2020

(30) Foreign Application Priority Data
Jul. 31, 2017 (EP) .................................... 17306021

(51) Int. Cl.
*C04B 40/00* (2006.01)
*C04B 28/04* (2006.01)
*C04B 103/52* (2006.01)
*C04B 111/10* (2006.01)
*C04B 111/21* (2006.01)

(52) U.S. Cl.
CPC .......... *C04B 40/0039* (2013.01); *C04B 28/04* (2013.01); *C04B 2103/52* (2013.01); *C04B 2111/1006* (2013.01); *C04B 2111/21* (2013.01)

(58) Field of Classification Search
CPC . C04B 28/04; C04B 40/0039; C04B 2103/52; C04B 2111/21; C04B 2111/1006; C04B 24/02; C04B 24/122; C04B 28/02; C04B 2103/30
See application file for complete search history.

(56) References Cited

U.S. PATENT DOCUMENTS

| 5,879,445 A | 3/1999 | Guicquero et al. |
| 2008/0202388 A1 | 8/2008 | Raynaud et al. |
| 2015/0336848 A1* | 11/2015 | Gulabani ................ C04B 28/02 106/727 |

FOREIGN PATENT DOCUMENTS

| CN | 1 972 466 | 5/2007 |
| CN | 1 974 466 | 6/2007 |
| CN | 101 289 293 | 10/2008 |
| CN | 101 348 346 | 1/2009 |
| CN | 101 397 199 | 4/2009 |
| CN | 102 079 642 | 6/2011 |
| CN | 106 673 479 | 5/2017 |
| EP | 0 663 892 B1 | 6/1997 |
| EP | 2 527 307 | 11/2012 |
| GB | 2 294 459 | 5/1996 |
| WO | WO 03/000617 | 1/2003 |
| WO | WO 2013/066192 | 5/2013 |

OTHER PUBLICATIONS

International Search Report, PCT/EP2018/070592, dated Nov. 13, 2018.
European Search Report, EP 17 30 6021, dated Jan. 18, 2018.
Written Opinion, PCT/EP2018/070592, dated Nov. 13, 2018.
Perez et al., "Why TIPA Leads to an increase in the Mechanical Properties of Mortars Whereas TEA Does Not", SP-217-38.

* cited by examiner

Primary Examiner — Anthony J Green
(74) Attorney, Agent, or Firm — Nixon & Vanderhye

(57) ABSTRACT

A method for preventing formation of rust-colored stains on the surface of a hydraulic composition includes mixing the hydraulic composition with an additive for hydraulic binder including at least a dialkanolamine including from 2 to 8 carbon atoms, and at least a polyol preferably chosen from a diol, a triol, a tetraol and mixtures thereof. Other uses include a grinding aid for hydraulic binder precursor, and/or improving the compressive strength of a set hydraulic composition.

8 Claims, No Drawings

ADDITIVE FOR HYDRAULIC BINDER USEFUL TO PREVENT THE FORMATION OF RUST-COLORED STAINS AT THE SURFACE OF HYDRAULIC COMPOSITIONS

BACKGROUND OF THE INVENTION

Field of the Invention

The present invention concerns an additive for hydraulic binder useful notably to prevent the formation of rust-colored stains at the surface of hydraulic compositions.

Description of the Related Art

Rust-colored stains can be observed on the surface of hydraulic compositions such as concrete. This staining phenomenon results in the apparition of highly visible yellow to dark brown or black staining at the surface of the set hydraulic compositions. These stains are unaesthetic and not desired, because the surface of concrete is expected to be gray, and not yellow or orange.

Application US 2008/0202388 teaches that such a staining occurs, and that the free $C_4AF$ (with $C=CaCO_3$, $A=Al_2O_3$, and $F=Fe_2O_3$) from the Portland Cement and which hydrates in the pore solution is the main source of staining. In order to reduce the occurrence and/or intensity of staining, this application recommends selecting the Portland cement amongst Portland cements having an iron oxide content of no more than 1% by weight based on the total weight of the Portland cement.

Triisopropanolamine (TIPA) is usually used in formulations of grinding aids and/or additives for cement or mortar and concrete in order to improve the fineness of the ground cement and/or the compressive strength, in particular the 28-day compressive strength, of concrete made therefrom, in particular its 28-day strength. However, rust-colored stains particularly appear when the hydraulic composition comprises TIPA.

Accordingly, additives for hydraulic binder are sought, which would allow preventing the formation of rust-colored stains on the surface of hydraulic compositions, while maintaining compressive strengths thereof comparable to those obtained with a hydraulic composition comprising TIPA as additive.

SUMMARY OF THE INVENTION

For this purpose, according to a first object, the invention concerns an additive for hydraulic binder comprising:
  at least a dialkanolamine comprising from 2 to 8 carbon atoms, preferably from 4 to 6 carbon atoms, and
  at least a polyol.

By the term of «hydraulic binder» is meant any compound having the property of hydrating in the presence of water and for which hydration gives the possibility of obtaining a solid having mechanical characteristics. The hydraulic binder may be a cement according to the EN 197-1 standard of 2012 and notably a cement of the CEM I, CEM II, CEM III, CEM IV or CEM V type according to the French standard Cement NF EN 197-1 of 2012. The hydraulic binder may also be a cement according to US standards ASTM C150/0150M-17 or ASTM C595/C595M-17.

By the term of "hydraulic binder precursor" is meant the unground raw materials of the hydraulic binder such as unground clinker, unground blast furnace slag, unground limestone, unground pozzolana or a mixture thereof.

Preferably, the dialkanolamine comprises from 4 to 6 carbon atoms, notably 6 carbon atoms.

The dialkanolamine typically has the following formula (I):

wherein $R^1$ and $R^2$ are independently an alkanol comprising from 1 to 7 carbon atoms and $R^3$ is chosen from H or an alkyl comprising from 1 to 6 carbon atoms, provided that the total number of carbon atoms of the dialkanolamine is from 2 to 8, preferably from 4 to 6, such as 6.

When $R^3$ is an alkyl, the alkaonolamine is a N-alkyldialkanolamine, such as N-methyldiethanolamine (MDEA). Preferably, $R^3$ represents H.

Diisopropanolamine (DIPA) is the most preferred dialkanolamine.

Preferably, the dialkanolamine has two hydroxyl functions.

The polyol preferably comprises from 1 to 20 carbon atoms, notably from 1 to 10 carbon atoms and/or from 2 to 10 hydroxy groups, preferably from 2 to 5 hydroxy groups.

The polyol is preferably chosen from:
  a diol such as an alkyleneglycol preferably comprising from 1 to 20 carbon atoms, notably from 1 to 10 carbon atoms, preferably chosen from monoethyleneglycol, diethyleneglycol, triethyleneglycol, tetraethyleneglycol and a mixture thereof,
  a triol, preferably glycerol,
  a tetraol, preferably erythritol, and
  a mixture thereof.

The composition typically comprises:
  from 5 to 80% wt, notably from 10 to 50% wt, preferably from 15 to 45% wt of at least a dialkanolamine comprising from 2 to 8 carbon atoms,
  from 5 to 80% wt, notably from 10 to 70% wt, preferably from 20 to 65% wt of at least a polyol.

The additive for hydraulic binder generally comprises less than 20% by weight, notably less than 10% by weight, typically less than 5% by weight, preferably less than 1% by weight, such as less than 0.5% by weight, such as less than 0.1% by weight of triisopropanolamine, and is preferably free from triisopropanolamine.

Advantageously, the additive for hydraulic binder according to the invention allows preventing the formation of rust-colored stains on the surface of hydraulic compositions, and in particular lowering the formation of rust-colored stains on the surface of hydraulic compositions compared to triisopropanolamine-based additives for hydraulic binder.

Without wishing to be bound to a specific theory, the inventors suppose that:
  the rust-colored stains would be caused by iron oxide or complexes comprising them present at the surface of the hydraulic compositions, and
  a dialkanolamine would complex less iron than TIPA, leading to a lower migration of iron and iron oxide to the surface of the hydraulic composition, and thus to a decreased yellow/orange coloration of said surface.

Section p. 217 to 238 "Why Does TIPA Lead to an Increase of the Mechanical Properties of Mortars When TEA Does Not?" of the book SP-217: Seventh CANMET/ACI International Conference on Superplasticizers and Other Chemical Admixtures in Concrete, Editor: V. M. Malhotra published in 2003 is silent about rust-color caused by TIPA, but teaches that TIPA would be able to make a water soluble complex with Iron III contained in the $C_4AF$ phase of cement and this would explain the improvement of the compressive strengths of the set hydraulic composition.

The additive for hydraulic binder generally comprises water, used as solvent.

The additive for hydraulic binder can further comprise a colorant, preferably a black colorant, such as Black Pond Dye. When the additive for hydraulic binder is free from colorant, the color thereof may vary from one batch to the other. The color variation may be disconcerting for the user. Adding a colorant to the additive for hydraulic binder allows obtaining an additive the color of which does not vary depending on the batch. This colorant does not have any impact on the color of the hydraulic composition comprising the additive, because the concentration of the colorant in the hydraulic composition is very low.

The additive for hydraulic binder can comprise other components chosen from:
- an antifoam agent, such as a trialkyl phosphate, for example triisobutyl phosphate or tributyl phosphate, an ethylene oxide/propylene oxide copolymer, a fatty acid, a fatty amine or an alkoxylated alcohol,
- a setting accelerator such as calcium nitrate, sodium nitrate, potassium nitrate, calcium nitrite, sodium nitrite, sodium thiocyanate, calcium thiocyanate, calcium chloride, sodium chloride, lithium sulfate, sodium sulfate; calcium bromide, sodium bromide, calcium aluminate or sodium aluminate
- a retarding and/or fluidifying additive,
- an air entrainer,
- and mixture thereof.

Within the scope of the invention, by fluidifying additive or water-reducing additive is meant an additive allowing reduction in the amount of water required for producing a hydraulic composition.

The retarding and/or fluidifying additive may be selected from the family of comb structure polymers, compounds comprising a polyalkoxylated chain and at least one amino-alkylene phosphonic group, or old-generation plasticizers, such as sugars, carboxylic acids, lignosulfonic acids, polynaphthalene sulfonic acids, polymelamine sulfonic acids, and salts of said acids; alone or as a mixture.

The polymers with a comb structure are notably selected from comb copolymers with a main polycarboxylate chain bearing lateral chains grafted with poly(alkyleneoxide) (or PCP).

The compounds comprise a polyalkoxylated chain and at least one amino-alkylene phosphonic group may be selected from the compounds of formula (I):

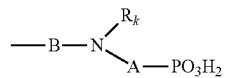

(I)

wherein:
R is a hydrogen atom or a monovalent hydrocarbon group including from 1 to 18 carbon atoms and optionally one or several heteroatoms;

the $R_i$ are similar or different from each other and represent an alkylene like ethylene, propylene, butylene, amylene, octylene or cyclohexene, or an arylene like styrene or methylstyrene, the $R_i$ optionally contain one or several heteroatoms;

Q is a hydrocarbon group including from 2 to 18 carbon atoms and optionally one or several heteroatoms;

A is an alkylidene group including from 1 to 5 carbon atoms;

the $R_j$ are similar or different from each other and may be selected from:
- the A-$PO_3H_2$ group, A having the aforementioned meaning,
- the alkyl group including from 1 to 18 carbon atoms and which may bear [R—O($R_i$—O)$_n$] groups, R and $R_i$ having the aforementioned meanings,
- and the group

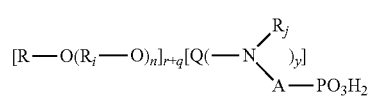

$R_k$ designating a group such as $R_j$, preferably $R_k$ is selected from an A-$PO_3H_2$ group, A having the aforementioned meaning; and an alkyl group including from 1 to 18 carbon atoms and which may bear [R—O($R_i$—O)$_m$] groups, R and $R_i$ having the aforementioned meanings;

B designating an alkylene group including from 2 to 18 carbon atoms,

"n" is a number greater than or equal to 0,

"r" is the number of [R—O($R_i$—O)$_m$] groups borne by the whole of the Rj,

"q" is the number of [R—O($R_i$O)$_n$] groups borne by Q, the sum

"r+q" is comprised between 1 and 10,

"y" is an integer comprised between 1 and 3,

Q, N and the $R_j$ may form together one or several rings, these ring(s) may further contain one or several other heteroatoms.

A polyalkoxylated polyphosphonate is particularly preferred, consisting of a water-soluble or water-dispersible organic compound including at least one amino-di-(alkylene-phosphonic) group and at least one polyoxyalkylated chain or at least one of its salts. In particular, the compounds of formula (I) wherein R is a methyl group, the $R_i$ are ethylene and propylene groups, n being comprised between 30 and 50, r+q has the value 1, Q is an ethylene group, A is a methylene group, y has the value 1 and $R_j$ corresponds to the $CH_2$—$PO_3H_2$ group.

Such compounds are notably described in patent EP 0 663 892. Preferably, this compound is notably contained in the product CHRYSO® Fluid Optima 100 available from CHRYSO.

As a particular example of a retarding and/or fluidifying additive contained in the product, mention may be made of CHRYSO® Fluid Optima 100 and CHRYSO® Fluid Optima 175 available from CHRYSO.

The sugars may be selected from glucose, fructose, saccharose, meritose, lactose, maltotriose, dextrose, maltose, galactose, mannose, glycogen, or one of their mixtures.

Carboxylic acids may be selected from gluconic acid, acetic acid, formic acid, oxalic acid, citric acid, malic acid, lactic acid, tartaric acid, malonic acid or one of their mixtures.

Polynaphtalene sulfonic acids and salts thereof are the preferred old generation of plasticizers.

The fluidifying additive may preferably be selected from comb copolymers with a main polycarboxylate chain bearing lateral chains grafted with polyalkyleneoxide (or PCP) or compounds of formula (I), or a mixture thereof.

In one embodiment, the additive for hydraulic binder consists of:
- at least a dialkanolamine comprising from 2 to 8 carbon atoms, preferably from 4 to 6 carbon atoms, at least a polyol,
optionally water,
optionally a colorant,
optionally an antifoam agent,
optionally a setting accelerator,
optionally a retarding and/or fluidifying additive,
optionally an air entrainer.

According to a second object, the invention concerns the use of the additive for hydraulic binder defined above as a grinding aid for hydraulic binder precursor.

By the term of "hydraulic binder precursor" is meant the unground raw materials of the hydraulic binder such as unground clinker, unground blast furnace slag, unground limestone, unground pozzolana or a mixture thereof.

Advantageously, the additive for hydraulic binder defined above allows improving the fineness of the ground hydraulic binder. This means that, when the additive for hydraulic binder defined above is used as grinding aid for hydraulic binder precursor, less energy and/or a decreased grinding duration are required to obtain the same fineness of the hydraulic binder.

The invention also concerns a method for improving the grinding of a hydraulic binder precursor comprising the steps consisting of bringing into contact the additive for hydraulic binder defined above with a hydraulic binder precursor, optionally in the presence of a supplementary cementitious material, to obtain a mixture and grinding the obtained mixture to obtain a ground hydraulic binder.

The expression of «supplementary cementitious material» refers to slags (as defined in the Cement NF EN 197-1 paragraph 5.2.2 standard of 2012), blast furnace slags, pozzolanic materials (as defined in the Cement NF EN 197-1 paragraph 5.2.3 standard of 2012), flying ashes (as defined in the Cement NF EN 197-1 paragraph 5.2.4 standard of 2012), calcined shales (as defined in the Cement NF EN 197-1 paragraph 5.2.5 standard of 2012), limestones (as defined in the Cement NF EN 197-1 paragraph 5.2.6 standard of 2012) or further silica fumes (as defined in the Cement NF EN 197-1 paragraph 5.2.7 standard of 2012) or mixtures thereof. Other additions, not presently recognized by the Cement NF EN 197-1 (2012) standard may also be used. These are notably metakaolins, such as metakaolins of type A according to the NF P 18-513 standard (2012), and siliceous additions, such as siliceous mineralogy additions Qz according to the NF P 18-509 standard (2012).

The invention also concerns a method for preparing a ground hydraulic binder comprising the steps consisting of bringing into contact the additive for hydraulic binder defined above with a hydraulic binder precursor, optionally in the presence of a supplementary cementitious material, to obtain a mixture and grinding the obtained mixture.

The invention also concerns the ground hydraulic binder obtained by this method, preferably ground cement obtained by this method.

The specific surface area in Blaine according to test Method A of ASTM C 204-05 standard of the ground hydraulic binder is generally from 2000 to 7000 cm$^2$/g, notably from 3000 to 6000 cm$^2$/g, preferably from 3500 to 5500 cm$^2$/g. This specific surface area in Blaine is related to the fineness of the hydraulic binder.

According to a third object, the invention concerns a hydraulic composition comprising the additive for hydraulic binder as defined above, a hydraulic binder, optionally a supplementary cementitious material and optionally a fluidifying agent.

The fluidifying additive is preferably as defined above. Generally, the fluidifying additive content in the hydraulic composition is from 0.2 to 3% by dry weight based on the weight of the hydraulic binder.

By «aggregates», is meant a set of mineralmaterial particles with an average diameter comprised between 0 and 125 mm. Depending on their diameter, the aggregates may be classified into:
one of the following six families: fillers, wind-blown sands, sands, sand-gravel mixes, grits and ballast (XP P 18-545 standard of September 2011), or
one of the seven grades of standard ASTM C33/C33M-16e1.

The most used aggregates are the following:
fillers, which have a diameter of less than 2 mm and for which at least 85% of the aggregates have a diameter of less than 1.25 mm and at least 70% of the aggregates have a diameter of less than 0.063 mm,
sands with a diameter comprised between 0 and 4 mm (in the EN 13-242 standard (2008), the diameter may range up to 6 mm),
sand-gravel mixes with a diameter of more than 6.3 mm,
gravels with a diameter comprised between 2 mm and 63 mm.

The sands are therefore comprised in the definition of an aggregate according to the invention.

The hydraulic compositions according to the invention are preferably concrete compositions.

By the term of «concrete», is meant a mixture of hydraulic binders, of aggregates, of sands, of water, optionally of additives, and optionally of a supplementary cementitious material. The term of «concrete» also comprises mortars.

Preferably, in the hydraulic composition according to the invention, the weight ratio of dialkanolamine versus the hydraulic binder is from $5\times10^{-6}$ to 0.01, notably from $1\times10^{-5}$ to 0.001, such as from $1\times10^{-4}$ to 0.0005 (dry weights). Lower dialkanolamine/hydraulic binder weight ratios generally lead to no improvement of the fineness of the ground hydraulic composition and/or to no improvement of the compressive strength and/or to no improvement of coloration of the set hydraulic composition made therefrom. The higher the dialkanolamine/hydraulic binder weight ratio is, the more expensive the hydraulic composition is. Moreover, as the additive for hydraulic binder generally comprises water, dialkanolamine/hydraulic binder weight ratios higher than 0.01 generally implies adding a too high proportion of water. The weight proportion of the additive for hydraulic binder in the hydraulic composition is thus adjusted to obtain these dialkanolamine/hydraulic binder weight ratios by taking into account the weight proportion of dialkanolamine in the additive for hydraulic binder.

The hydraulic composition according to the invention comprises the additive for hydraulic binder according to the invention and thus comprises a dialkanolamine.

The hydraulic composition according to the invention generally has a compressive strength according to ASTM C 109/C 109 M Standard Test Method (2016), in particular a 28-day compressive strength, which is at least 80%, notably at least 90%, preferably at least 95% of the one of a hydraulic composition comprising the same components in the same proportions, except that it comprises TIPA instead of the dialkanolamine.

The surface of the hydraulic composition according to the invention generally exhibits less rust-colored stains than the one of a hydraulic composition comprising the same components in the same proportions, except that it comprises TIPA instead of the dialkanolamine. The appearance of rust-colored stains can be observed visually. A CIE Lab color space can also be used to compare their colors: the surface of the hydraulic composition according to the invention is grey, whereas the one of the hydraulic composition comprising TIPA is more yellow/orange.

According to a fourth object, the invention concerns a method for preparing said hydraulic composition, comprising the step consisting of mixing a hydraulic composition or a constituent of a hydraulic composition with an additive for hydraulic binder as defined above.

The additive for hydraulic binder may actually be mixed with a hydraulic composition or else with one of its constituents before being put into contact with the other constituents in order to form the hydraulic composition.

Mixing of a hydraulic composition or one of its constituents with the additive for hydraulic binder may be carried out in a quarry, a concrete producing unit, or during the preparation of dry mortar.

According to a first and preferred embodiment, the additive for hydraulic binder is mixed with a hydraulic binder precursor or with a hydraulic binder, before introducing this hydraulic binder into the hydraulic composition. Thus, the invention also relates to a method for preparing an aforementioned hydraulic composition, comprising the steps:
    mixing the additive for hydraulic binder as defined above with a hydraulic binder precursor or with a hydraulic binder, said mixing being optionally implemented in the presence of a supplementary cementitious material, and then
    mixing the obtained mixture with at least one aggregate, water and optionally a fluidifying agent.

The step for mixing the additive for hydraulic binder with a hydraulic binder precursor is preferably carried out during grinding of the hydraulic binder precursor, said grinding being optionally implemented in the presence of a supplementary cementitious material.

The hydraulic binder is preferably cement.

According to another embodiment, the additive for hydraulic binder is mixed with a fluidifying agent before introducing this fluidifying agent into the hydraulic composition. Thus, the invention also relates to a method for preparing the aforementioned hydraulic composition, comprising the steps:
    mixing the additive for hydraulic binder as defined above with a fluidifying agent, and then
    mixing the obtained mixture with at least one aggregate, one hydraulic binder, water and optionally a supplementary cementitious material.

According to another embodiment, the additive for hydraulic binder is mixed with a supplementary cementitious material, before introducing this supplementary cementitious material into the hydraulic composition. Thus, the invention also relates to a method for preparing the aforementioned hydraulic composition, comprising the steps:
    mixing the additive for hydraulic binder as defined above with a supplementary cementitious material, and then
    mixing the obtained mixture with at least one aggregate, a hydraulic binder, water, and optionally a fluidifying agent.

According to another embodiment, the additive for hydraulic binder is mixed with water prior to the introduction of this water into the hydraulic composition. Thus, the invention relates to a method for preparing an aforementioned hydraulic composition, comprising the steps:
    mixing the additive for hydraulic binder as defined above with water, and then
    mixing the obtained mixture with a hydraulic binder, at least one aggregate, optionally a fluidifying agent and optionally a supplementary cementitious material.

Generally, the water applied during mixing is mixing water, i.e. the water incorporated to the mixture of hydraulic binder and of aggregates in order to cause its setting and giving the concrete its plasticity, therefore its workability. The quality of the mixing water should meet the EN 206-1 standard (2014).

According to another embodiment, the additive for hydraulic binder is mixed with an aggregate, notably in a quarry, before introducing this aggregate into the hydraulic composition. Thus, the invention also relates to a method for preparing the aforementioned hydraulic composition, comprising the steps:
    mixing additive for hydraulic binder as defined above with at least one aggregate, and then
    mixing the obtained mixture with a hydraulic binder, water, optionally a fluidifying agent and optionally a supplementary cementitious material.

According to a fifth object, the invention concerns the use of the additive for hydraulic binder defined above to prevent the formation of rust-colored stains at the surface of a hydraulic composition and/or to improve the compressive strength according to ASTM C 109/C 109 M Standard (2016), in particular the 28-day compressive strength, of a set hydraulic composition.

The invention also concerns a method for preventing the formation of rust-colored stains at the surface of a hydraulic composition and/or for improving the compressive strength according to ASTM C 109/C 109 M Standard (2016), in particular the 28-day compressive strength of a set hydraulic composition, said method comprising the step consisting of mixing a hydraulic composition or a constituent of a hydraulic composition with an additive for hydraulic binder as defined above. The embodiments described above as regards the fourth object may be applied.

DESCRIPTION OF THE PREFERRED EMBODIMENTS

The following examples illustrate the invention.

EXAMPLES

Methods:

Cement fineness is expressed either in terms of Particle Size Distribution (PSD) with residues (or passing) on reference sieves, or by its specific surface area in Blaine. D10, D50 and D90 were measured by laser light diffraction.

325 mesh Sieve (i.e. about 44 μm sieve) and #450 mesh Sieve (i.e. about 32.0 μm sieve) were used as reference sieves for the passing tests.

Test Method A of ASTM C 204-05 Standard Test Methods for Fineness of Hydraulic Cement by Air-Permeability Apparatus was used to determine the Blaine Specific Surface Area. The single-operator coefficient of variation for Portland cements has been found to be 1.2%. Therefore, results of two properly conducted tests, by the same operator, on the same sample, should not differ by more than 3.4% of their average.

The ASTM C1565-09 standard was used to determine the relative pack-set tendency of the prepared cements. Low pack set Indexes are sought because the ground cement exhibits a better flowability and is thus easier to process.

The ASTM C 191-13 Standard Test Method was used to determine the time of Setting of Hydraulic Cement by Vicat Needle: The single-operator standard deviation has been found to be 12 min for the initial time of setting throughout the range of 49 to 202 min. Therefore, results of two properly conducted tests by the same operator and with similar paste should not differ from one another by more than 34 min on the Vicat initial time of setting.

The ASTM C 109/C 109 M Standard Test Method (2016) was used for determining the Compressive Strengths of the prepared hydraulic compositions.

The coloration tests were performed as follows. The hydraulic compositions samples were immersed under a head of water of 1 inch (2.54 cm) (corresponding to the half of their heights) during 28 days. The coloration of the surface thereof was then determined with a visual test. 0 means no coloration (i.e. the grey color typical for a hydraulic composition was observed), whereas "+" means that a rust-colored stains were observed on the surface of the prepared hydraulic compositions.

Example 1: Additive for a Cement 1 Free from Supplementary Cementitious Materials Additives for hydraulic binder having the compositions detailed at table 1 were prepared by mixing the different components.

TABLE 1 composition of the additives for hydraulic binder

| % wt | 85% wt DIPA aq. sol. | 85% wt TIPA aq. sol. | TEA** | Amine | DEG | Glycerin 98% min | polyol* | glycol blend*** | TBP | Acetic Acid | Water |
|---|---|---|---|---|---|---|---|---|---|---|---|
| SP141 (invention) | 22.0 | — | — | 6.0 | — | 15.0 | 28.6 | 20.000 | 1.000 | — | 7.4 |
| SP142 (invention) | 26.0 | — | — | — | — | 15.0 | 28.6 | 20.000 | 1.000 | — | 9.4 |
| S026 (comparative) | — | 25.7 | — | — | — | 15.0 | 24.9 | 26.7 | — | — | 7.7 |
| reference | — | — | 19.9 | — | 68.7 | — | — | — | — | 11.4 | — | aq. sol.: aqueous solution
*polyol mixture comprising from 0-10% wt of monoethyleneglycol, 0-85% wt of diethyleneglycol, 15-100% wt of triethyleneglycol and 0-15% wt of tetraethyleneglycol
**amine mixture comprising 39-100% wt of N-methyl-N-hydroxyethyl-N-hydroxyethoxyethylamine and 10-55% wt of N-methyldiethanolamine (MDEA)
***glycol mixture comprising 3-5% wt of monoethyleneglycol, 75-85% wt of diethyleneglycol, 13-20% wt of triethyleneglycol, about 1% of tetraethyleneglycol and 0-1% wt of water.
****85-99% wt triethanolamine, the balance of the product being distillation residues (ethanolamine oligomers)
TBP: tributylphosphate
TEA: triethanolamine A mixture constituted of 93.0% wt of clinker and of 7.0% wt of gypsum was introduced into a grinder, and 0.057% wt of one of the additive for hydraulic binder as defined at table 1 versus the total weight of the mixture was added. The additives for hydraulic binder were thus used as grinding aids. The samples were ground for 147 min at 60 rpm. The 147 min duration is suited to obtain cements, the fineness of which is appropriate to prepare a hydraulic composition.

The hydraulic compositions (mortar) were prepared by mixing 500 g of one of the prepared cements, 1375 g of ASTM-C109 humbolt test sand and 300 g of city water. Hydraulic compositions in the form of 2 inches (5.08 cm) cubes were prepared and removed from the mold after 24 hours.

The features of the prepared cements and of the hydraulic compositions made therefrom are specified at table 2.

TABLE 2 features of the prepared cements and of the hydraulic compositions made therefrom

| Sample | #325 Sieve (% passing) | #450 Sieve (% passing) | Blaine (m²/kg) | Initial Set Time (min) | Pack Set Index | Stains | 1 Day (MPa) | 1 Day % Ref | 7 Day (MPa) | 7 Day % Ref | 28 Day (MPa) | 28 Day % Ref |
|---|---|---|---|---|---|---|---|---|---|---|---|---|
| reference | 98.3 | 93 | 388 | 55 | 3 | 0 | 17.9 | 100.0 | 33.2 | 100.0 | 42.3 | 100.0 |
| SP026 (comparative) | 99 | 93.4 | 383 | 60 | 2 | + | 18.2 | 101.9 | 35.5 | 106.8 | 45.0 | 106.2 |
| S141 (invention) | 99 | 93.2 | 388 | 65 | 2 | 0 | 19.4 | 108.9 | 36.0 | 108.3 | 45.1 | 106.5 |
| S142 (invention) | 98.9 | 93.3 | 388 | 65 | 2 | 0 | 18.5 | 103.9 | 35.6 | 107.1 | 43.9 | 103.7 |

Finenesses of the ground cements (both Blaine Specific Surface Area and passing sieves results) and initial set times of hydraulic composition made therefrom were comparable from one sample to the other.

The comparative composition comprising TIPA provided adequate fineness of the ground cement and good 28-day strength of the hydraulic composition obtained therefrom. However, rust-colored stain was observed.

The additive for hydraulic binder used as reference is free from TIPA and did not lead to any coloration of the surface of the hydraulic composition, but the 28-day strength of the hydraulic composition obtained therefrom is lower than the one obtained with the comparative composition comprising TIPA.

Both additives for hydraulic binder according to the invention allowed obtaining a hydraulic composition with a 28-day strength comparable to the one of the comparative composition comprising TIPA, and no coloration of the surface of the hydraulic composition was observed.

Example 2: Additive for a Cement 2 Comprising Supplementary Cementitious Materials Additive for hydraulic binder having the compositions detailed at table 3 were prepared by mixing the different components.

TABLE 3 composition of the additives for hydraulic binder

| % wt | 85% wt DIPA aq. sol. | 85% wt TIPA aq. sol. | TEA**** | Glycerin 98% min | Glycerin 99% min | polyol* | Glycol blend*** | Acetic Acid | Black Pond Dye | Water |
|---|---|---|---|---|---|---|---|---|---|---|
| Sp151 (invention) | 25.000 | | | | | 50.3 | 20.000 | | | 4.7 |
| SP021 (invention) | 46.7 | | 11.7 | 11.7 | | | | | | 29.8 |
| Reference | | | 42.9 | | 10.1 | | 17.7 | 0.010 | 29.2 | |
| CGA (comparative) | | 22.2 | 27.2 | | | | 15.5 | 11.3 | 0.01 | 23.8 |

*polyol mixture comprising from 0-10% wt of monoethyleneglycol, 0-85% wt of diethyleneglycol, 15-100% wt of triethyleneglycol and 0-15% wt of tetraethyleneglycol
***glycol mixture comprising 3-5% wt of monoethyleneglycol, 75-85% wt of diethyleneglycol, 13-20% wt of triethyleneglycol, about 1% of tetraethyleneglycol and 0-1% wt of water.
****85-99% wt triethanolamine, the balance of the product being distillation residues (ethanolamine oligomers)
TBP: tributylphosphate
TEA: triethanolamine A mixture constituted of 84.5% wt of clinker, 4.5% wt of gypsum and 11% wt of limestone was introduced into a grinder, and 0.057% wt of one of additives for hydraulic binder as defined at table 3 versus the total weight of the mixture was added. The additives for hydraulic binder were thus used as grinding aids. The samples were ground for 160 min at 60 rpm. The 160 min duration is suited to obtain cements, the fineness of which is appropriate to prepare a hydraulic composition.

The hydraulic compositions (mortar) were prepared by mixing 500 g of one of the prepared cements, 1375 g of ASTM-C109 humbolt test sand and 300 g of city water. Hydraulic compositions in the form of 2 inches (5.08 cm) cubes were prepared and removed from the mold after 24 hours.

The features of the prepared cement and of the hydraulic composition made therefrom are specified at table 4

TABLE 4 features of the prepared cements and of the hydraulic compositions made therefrom

| Sample Tested | #325 Sieve (% passing) | #450 Sieve (% passing) | Blaine (m²/kg) | Initial Set Time (min) | Stains | Pack Set Index | D10 (μm)* | D50 (μm)* | D90 (μm)* | 1 Day (MPa) | 1 Day % Ref | 7 Day (MPa) | 7 Day % Ref | 28 Day (MPa) | 28 Day % Ref |
|---|---|---|---|---|---|---|---|---|---|---|---|---|---|---|---|
| SP 151 (invention) | 96.9 | 90 | 480 | 85 | 0 | 4 | 0.906 | 7.239 | 26.648 | 19.3 | 103.8 | 32.8 | 104.8 | 40.2 | 108.4 |
| CGA (comp.) | 96.9 | 90 | 476 | 80 | + | 3 | 0.894 | 7.205 | 25.945 | 19.1 | 102.7 | 32.7 | 104.5 | 40.3 | 108.6 |
| reference | 96.3 | 87.7 | 462 | 90 | 0 | 4 | 0.904 | 6.957 | 24.929 | 18.6 | 100 | 31.3 | 100 | 37.1 | 100 |
| SP021 (invention) | 96.2 | 89.8 | 500 | 90 | 0 | 5 | 0.876 | 6.958 | 25.504 | 19.4 | 104.3 | 32.1 | 102.6 | 38.9 | 104.9 |

Finenesses of the ground cements (both Blaine Specific Surface Area and passing sieves results) and initial set times of hydraulic composition made therefrom were comparable from one sample to the other.

The comparative composition comprising TIPA provided adequate fineness of the ground cement and good 28-day strength of the set hydraulic composition obtained therefrom. However, rust-colored stain was observed.

The additive for hydraulic binder used as reference is free from TIPA and did not lead to any coloration of the surface of the hydraulic composition, but the 28-day strength of the hydraulic composition obtained therefrom is lower than the one obtained with the comparative composition comprising TIPA.

Both additives for hydraulic binder according to the invention allowed obtaining a hydraulic composition with a 28-day strength comparable to the one of the comparative composition comprising TIPA, and no coloration of the surface of the hydraulic composition was observed.

The invention claimed is:

1. A method for preventing the formation of rust-colored stains at the surface of a hydraulic composition, said method comprising the step consisting of mixing a hydraulic composition or a constituent of a hydraulic composition with an additive for hydraulic binder comprising:

water
diisopropanolamine, and
a polyol,
wherein, in the hydraulic composition, the weight ratio of diisopropanolamine to the hydraulic binder is from $1 \times 10^{-4}$ to 0.0005.

2. The method according to claim 1, wherein the polyol is chosen from a diol, a triol, a tetraol and mixtures thereof.

3. The method according to claim 2, wherein the diol is an alkyleneglycol.

4. The method according to claim 1, wherein the additive for hydraulic binder comprises less than 20% by weight of triisopropanolamine.

5. The method according to claim 1, wherein the hydraulic composition comprises the additive for hydraulic binder, a hydraulic binder, optionally a supplementary cementitious material and optionally a fluidifying agent.

6. The method according to claim 5, wherein the hydraulic binder is a cement.

7. The method according to claim 3, wherein the alkyleneglycol comprises from 1 to 20 carbon atoms.

8. The method according to claim 4, wherein the additive for hydraulic binder is free from triisopropanolamine.

* * * * *